US007950479B2

(12) United States Patent
Bullis

(10) Patent No.: US 7,950,479 B2
(45) Date of Patent: May 31, 2011

(54) HIGH EFFICIENCY VEHICLE

(76) Inventor: James Kenneth Bullis, Sunnyvale, CA (US)

(*) Notice: Subject to any disclaimer, the term of this patent is extended or adjusted under 35 U.S.C. 154(b) by 790 days.

(21) Appl. No.: 11/893,497

(22) Filed: Aug. 16, 2007

(65) Prior Publication Data

US 2009/0044991 A1 Feb. 19, 2009

(51) Int. Cl.
*B62D 61/10* (2006.01)

(52) U.S. Cl. ........ 180/24.01; 180/14.1; 180/22; 180/23; 180/24.07; 280/419; 244/24; 244/50; 244/99.2

(58) Field of Classification Search ................. 180/14.1, 180/22, 23, 24.01, 24.07, 24.12, 212; 280/419; 244/24, 50, 99.2, 99.3, 113, 117
See application file for complete search history.

(56) References Cited

U.S. PATENT DOCUMENTS 4,042,053 A * 8/1977 Sieren et al. .................. 180/236
4,537,373 A * 8/1985 Butts ............................... 244/22
4,579,297 A * 4/1986 Ayoola .............................. 244/2
5,984,228 A * 11/1999 Pham ............................... 244/2
6,886,776 B2 * 5/2005 Wagner et al. ............... 244/12.4
6,974,105 B2 * 12/2005 Pham ............................... 244/6
2003/0062443 A1 * 4/2003 Wagner et al. ............... 244/12.3
2005/0045762 A1 * 3/2005 Pham ............................ 244/7 R
2009/0124143 A1 * 5/2009 Kanerva ..................... 440/12.63

* cited by examiner

*Primary Examiner* — Toan C To

(57) ABSTRACT

Here is invented an efficient road vehicles having special aerodynamic shapes, with stabilizing devices that enable aerodynamic efficiency. It is an articulated vehicle that is tall and narrow. It includes a carriage part that encloses a driver and passenger riding in tandem. This car is only wide enough for persons seated in single file, so it has very low projected frontal area compared with typical cars. Further, the narrow width makes a body shaped like an airship practical, where that shape is characterized by a very low drag coefficient in free flow conditions. The carriage is elevated on struts to enable such free flow aerodynamic conditions, thus the drag coefficient of the airship is made applicable to this road vehicle. Because this car has both low frontal area and low drag coefficient it will require minimal energy for high speed operation.

27 Claims, 12 Drawing Sheets

HIGH EFFICIENCY VEHICLE

This patent document contains material that is subject to copyright protection. Facsimile reproduction is allowed of the patent document or the patent disclosure as it appears in the Patent and Trademark Office patent file or records as allowed by US patent law, but otherwise all copyright rights are reserved.

BACKGROUND OF THE INVENTION

1. Field of the Invention

This present invention relates to motor vehicles.

2. Description of the Prior Art

Aerodynamic efficiency is a high priority in design of air vehicles. In design of automobiles it ranks below a list of requirement that conflict with efficiency, some of which are rarely questioned. Such are requirements for two front seats, ease of implementation, and fashion conformity. When energy is inexpensive and inexhaustible, such requirements are not a problem. Technological innovations, for example electric drive systems capable of regenerative braking, are interesting curiosities. Adequate motivation for significant innovation is lacking and key decision makers need have no understanding of innovative possibilities. Thus, when the energy equation is significantly changed, the world wide motor vehicle industry is ill equipped to adapt effectively. In such a world, minor improvements pass for important progress. Useful principles, if not completely forgotten, are poorly understood.

A basic concept in aerodynamics is that of drag coefficient. At any given speed the actual drag force is proportional to the product of projected frontal area and the drag coefficient value. While the drag coefficient value is a function of Reynolds number, for vehicle sizes and speeds of interest that drag coefficient value is reasonably constant. An effort to reduce the width of cars by eliminating the right front seat, as in U.S. Pat. No. 7,338,061, Bullis, Mar. 4, 2008, accomplished a significant reduction in projected frontal area. Further aerodynamic drag force reduction depends on reduction of drag coefficient.

The ideal airship shape is available from the history of aerodynamic research. Prior to developing the modern airplane wing shape, Prandtl and his students at his Gottingen University laboratory in Germany, with cooperating American researchers, studied the aerodynamics of airships. Such vehicles were of great interest in 1906, their use continuing through WWII. A typical airship shape was developed that was roughly a cylinder with tapered ends, this being a body of revolution about an axis aligned with the flight direction. Prandtl showed that drag force due to accelerative effects could be almost eliminated by a refined taper function. Only a small viscous drag then remains. Wind tunnel test results are available that can be scaled to dimensions appropriate for the automobile. In spite of this background, very little of this technology has been used in the design of road vehicle.

It appears that a large impediment to progress in this regard is the nearly universal requirement for seating arrangements that include, at least, two front seats. Therefore, to enclose two adults seated in such front seats in a body of revolution requires that such a body be about six feet in diameter. Thus, the attempt in the 1930 era to utilize the airship resulted in a car known as the Dymaxion. This example is said to have achieved improved gas mileage for its day, but nothing like what might be expected for a body of revolution somewhat similar to the ideal airship known to Prandtl. A significant difference was that it was not significantly elevated above the ground. Given that stability of this vehicle was a concern, that limitation seems inescapable.

The kind of thinking ingrained in the process of automobile design is illustrated in a Mercedes Benz press release that discusses development of an automobile based on a nearly ideal aerodynamic body form. They utilized the shape of an unusual looking fish known as the box-fish known for low hydrodynamic drag. The initial test model was shaped like that fish and wind tunnel tests showed it to be subject to extremely low air drag. It is not noted in the release, but having width approximately equal to height means that this functions much like a body of revolution. They do discuss the effect of testing at a significant separation distance from the ground, such that free flow aerodynamic conditions are maintained. While they measured extremely low drag in free flow conditions, when more realistic conditions were represented, by testing in proximity to the ground, they suffered a 50% penalty in drag coefficient. They further indicate that adding other features necessary for a realistic car, as well as the provision for operation close to the ground, causes a degradation of drag resistance of more than 200% relative to the ideal body test results in free flow conditions. Such features included wheel wells that provide for wheel steering and suspension devices. The inability of these experts to achieve better results can be attributed to their ground rule, as stated by the press release, that the vehicle width required for seating two persons was six feet. Apparently, a single wide car is inconceivable, at least for major production auto makers. Thus, they are barred from realization of the accumulating advantages of such an arrangement, where a reduction in projected frontal area, closer adherence to the ideal shape, and practicality of elevating such a shape are realizable measures to improve efficiency. The wide form naturally leads to a flat bottomed form which further exacerbates the degradation in drag coefficient caused by proximity to the ground. While this development effort achieved a significant improvement in aerodynamic efficiency, it came far short of the level of performance originally suggested by the box-fish ideal shape. This development process thus illustrates the requirements and assumptions that are a basic part of the present day automotive design process.

A practical rule for achieving an approximation of free flow conditions can be postulated based on a ground separation requirement related to the frontal projected area, where this rule stipulates an elevation sufficient for achieving a significant practical performance advantage. For bodies of revolution and for rectangular shapes having width greater than height, an approximate elevation standard is one half of the square root of the projected frontal area. Applying this rule to a six foot wide body of revolution car, where two people can ride side-by-side, leads to an overall car height of over eight feet. This would obviously not appeal to car designers.

It might be supposed that a narrow car would have been considered by the Mercedes-Benz project team that worked on the box fish shape, were a practical way to stabilize such a car available. The previous invention that might have been useful in this concept work, U.S. Pat. No. 7,338,061, Bullis, Mar. 4, 2008, was not available at that time.

Faced with these realities, the nearly universal choice has been to give up on the ideal body form and any attempt at elevation. In fact, most designs go in the opposite direction. Efforts to make cars economical usually result in a very low vehicle body height that is spaced as close as possible to the ground. The designs usually direct air flow over, and to the sides of, the car. At least this ends up with low and wide car that is naturally stable. The obvious drawback of significantly uncomfortable seating and unpleasant height of eye has never been widely accepted by car buyers. The automotive industry has, thus, failed to show a development path capable of addressing present fuel efficiency concerns.

An exception is suggested by a developmental vehicle called the Aptera, which appears to the published description to be a very lightweight vehicle, probably less than a large motorcycle; with an extremely wide wheel base, apparently about as wide as that of a large truck. This is reported to be an aerodynamic shape designed by an optimizing, finite element computer code, where the coefficient of drag seems to be nearly ideal. Inspection of the published information seems to show a ground clearance that allows some increase of air flow under the vehicle, compared to typical cars. This ground clearance, together with the body shape, appears to be working to minimize ground surface effect, whether or not this was an intention of the designers or a determination made by the optimizing computer code. The vehicle is still very low overall, and this appears to be at the expense of rider comfort, where two adults are said to be riding side by side, with very little headroom. Since there is no provision for stabilization beyond weight in the vehicle body and the wide wheel base, it is important that the overall height be as low as possible. Given that it carries two adults side by side, this vehicle is a remarkable achievement in aerodynamic design. It shows the potential for shape refinement of the finite element method.

There have been some attempts to produce a narrow car with seating width for only one person. The Stanley Steamer race car of 1885 was for a single person and it was built with some meaningful consideration of aerodynamic performance. However, its open cockpit and exposed driver prevented most of the intended low drag effect. The cycle cars of the 1910 era were also narrow, but aerodynamic shape was not a significant part of these designs. Cars were produced in the 1950 era with single wide seating, such as the Messerschmitt, which also was very carefully shaped for aerodynamic effect, but this also was very low to the ground. Designing a car with an elevated body on a conventional wheel base would require addition of significant, low placed weight to achieve a stable vehicle. However, gas mileage goals have always tended to encourage car designs that were light weight, especially where the usual propulsion machinery had no capability to recapture kinetic energy by use of regenerative braking. Rolling resistance due to friction in tires and drive train apparatus further discourages heavy vehicles. Consequently, there could be little incentive in the past to create a car having an elevated body.

A high and narrow vehicle, where persons were seated singly or in tandem, was discussed in U.S. Pat. No. 7,338,061, Bullis, Mar. 4, 2008 (hereby incorporated by reference). That invention focused on providing a method of stabilizing such a vehicle using an articulated vehicle arrangement that was a two frame system, having a stabilizer part that was connected to a carriage part with a two axis articulated joint. A streamlined version was also included in this disclosure. A body is said to be streamlined where that body has a controlled contour where stream line convergence is fairly rapid and stream line divergence is very gradual, where a stream line is an imaginary line which is, at the instant of observation, tangent to the velocity vector at every point through which it passes. However, in this arrangement it was necessary for the stabilizer rear wheels to pass under the carriage part and the necessary clearance for this was increased by the need for carriage pitch hinging action. This meant a trade-off had to be made between overall vehicle height and a desire for an uninterrupted aerodynamic carriage surface. It was also necessary for the forward part of the carriage to allow clearance for pitching. This limited shaping possibilities. Further, this disclosure did not provide for an aerodynamic carriage entity that operated independently of the stabilizer part. Neither did it provide for an aerodynamically integrated carriage and stabilizer. Also, this prior disclosure showed the streamlined version as vertically elongated, with its lowest point raised above the ground only high enough to give reasonable clearance of uneven surfaces, with no provision for air flow under the vehicle.

While general vehicle shaping can potentially provide very useful results, failure to attend to details can almost void such benefits. An example of such detail is the wheel well configuration used. In all the years of industry history, only very limited attempts have been made to fix this known cause of automobile and truck inefficiency. Similarly, only sporadic attempts have been made to make the under body surface smooth.

With these limitations, the degree of aerodynamic shaping refinement represented in that prior disclosure was not clearly superior to that of conventional automobiles. Thus the fuel economy improvement was based only on the greatly reduced width. Almost doubling of gas mileage was expected. Although widespread public acceptance of this breakthrough requires rearrangement of the way people sit in cars, this expected improvement in gas mileage is expected to strongly motivate such changes.

However, there remains strong motivation for even further improvement. It is reasonable to expect that the entire world population will increasingly insist on participating in a life style that includes the ability to move about quickly, safely, and comfortably. As life styles are transformed, energy conservation, pollution, and global warming problems will be exacerbated. A major part of the solution to these problems could be a large reduction in the amount of energy needed for transportation. While it is well known that public transportation holds promise in that regard, it is clear that most people prefer distributed living that tends to be inconsistent with practical public transportation systems. It is here assumed that a solution that preserves the fast personal car, with its associated time efficiency and flexibility, will be much more readily accepted.

SUMMARY OF THE INVENTION

Here disclosed are efficient road vehicles having special aerodynamic shapes, with stabilizing devices that enable aerodynamic efficiency. An embodiment is car that is tall and narrow. It includes a carriage part that encloses a driver and passenger riding in tandem. This car is only wide enough for persons seated in single file, so it has very low projected frontal area compared with typical cars. Further, the narrow width means that a body shaped like an airship can be used. That shape is characterized by a very low drag coefficient in free flow conditions. Since this body can be elevated on struts to enable such free flow aerodynamic conditions, the drag coefficient of the airship is made applicable to this road vehicle. Thus achieved is a car having both low frontal area and low drag coefficient that will require minimal energy for high speed operation.

The struts connect to low profile wheel trains on each side of the vehicle, such that the carriage and wheel trains act as isolated aerodynamic entities. The wheel trains are horizontal columns that include equipment and wheels, enclosed with fairing surfaces and made aerodynamically smooth with special fairing devices. Together these parts also form a special stabilization system that is essential for road operation of this narrow car.

The stabilizing system structure includes a front wheel axle, a control wheel axle, and a rear wheel axle and a mechanism that keeps at least one wheel from each axle in contact with the road. Control wheels are mounted to individually pivot on their vertical axes, where a linkage enables pivot control of the control wheels by a driver. When the control wheels are pivoted, forward motion of the narrow vehicle then causes the control wheels to shift laterally toward the outside of a turn, whereby a control wheel, now extended to the side, sets a stabilizing stance. The control wheels are linked to the front wheels, such that their lateral shift causes the front wheels to change their travel direction to follow a turning path. The carriage is then guided along the turning path by the front wheels, with the rear wheels tracking on the road surface to hold the carriage toward the inside of the turn.

DETAILED DESCRIPTION OF THE PREFERRED EMBODIMENT AND VARIATIONS

Figure 1:
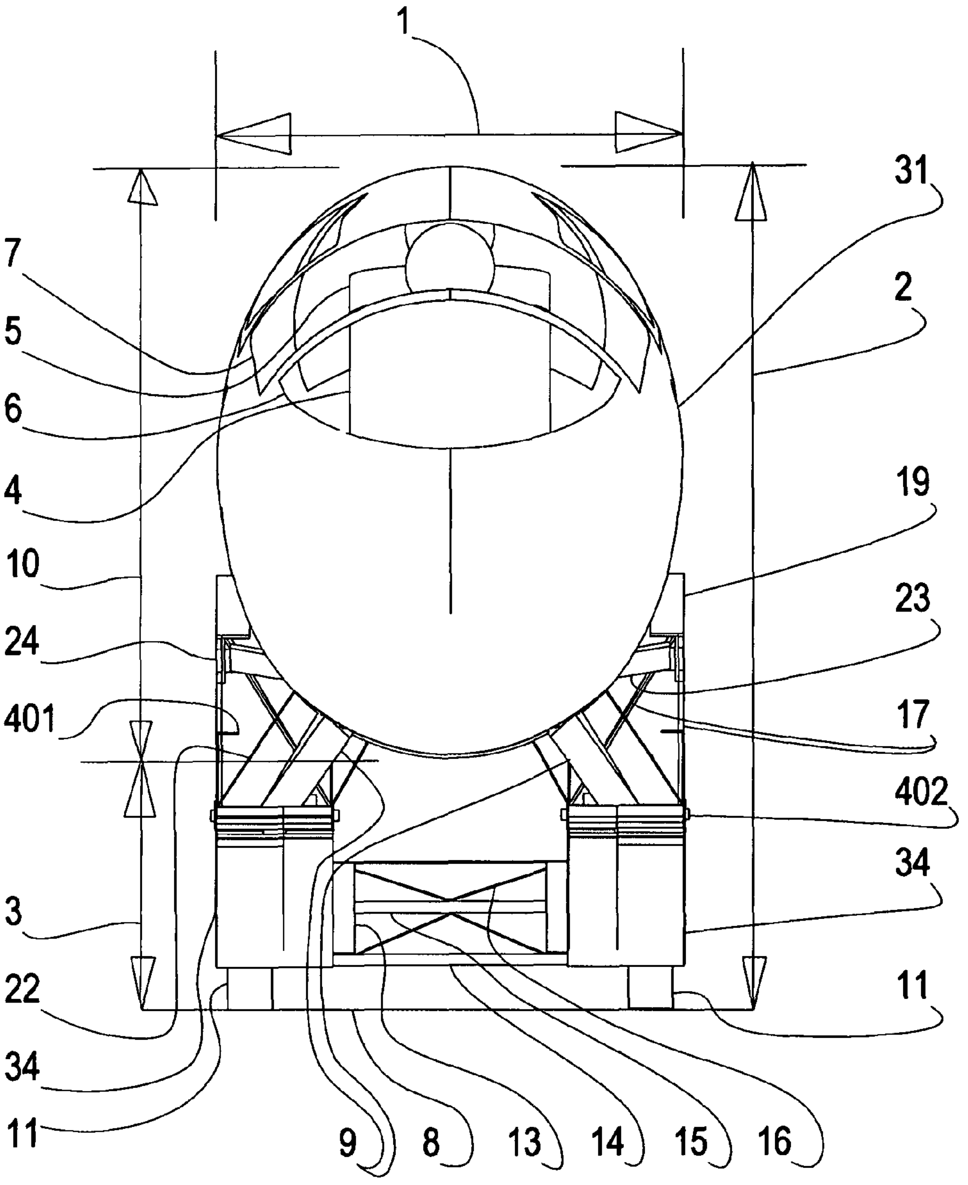
FIG. 1 Frontal view of an elevated airship held on struts for free flow operation.

The preferred embodiment offers a way to greatly reduce the amount of fuel needed for personal road transportation. For the most part, this fuel comes from burning hydrocarbons, whether they are oil derived or coal. While there are potential efficiency advantages, use of electrical energy does not significantly change this, since use of energy in this form only means that the fuel is burned at some distant site. Thus, the appropriate objective is to simply reduce the amount of energy needed. It should also be framed in terms of reducing the amount of energy needed to transport one person a distance of one mile. It must also satisfy the need for rapid transportation, given that time sitting in a car is a negative measure of effectiveness in transportation.

The present invention is designed to greatly cut energy usage and it is particularly effective for high speed automotive operation. While commercial acceptance will depend on people changing the way they drive and ride in cars, incentives promised by this new vehicle type include continuation of the high speed mobility to which people are accustomed, where that life style is threatened by energy shortages, pollution, and global warming issues. Furthermore, the driver is provided with a commanding view of the road, enabling superior driving compared to other possible efficient vehicles. Improvements in safety and comfort are also envisioned. Still further, more cars can move on the road and more can be parked in a given sized parking lot. Inexpensive construction is also planned. A profound world-wide impact is envisioned.

The embodiment design adapts airship research to the automotive field. Special stabilization features are incorporated to produce a practical car that is free of most of the air drag force that is a major cause of automobile inefficiency. This new car has both a very low air drag coefficient and a low projected frontal area. Because the force caused by air drag, at any given speed, is proportional to a product of that projected frontal area and that drag coefficient, the resulting air drag force is less than a fourth that of the typical car. Although this is most important at highway speeds, with other efficiency measures such as electric wheel drive that eliminates much of the typical drive train machinery, hybrid propulsion system with regenerative braking, and low friction loss tires, overall gas mileage up to about 200 miles per gallon is expected.

This new car is a stabilized, narrow vehicle that is just wide enough to seat large adults in single file. This alone accomplishes a reduction of projected frontal area to about half that of a typical car. Further, that narrow seating arrangement makes it practical to enclose the seated adults in an aerodynamic body shape known to have a very low drag coefficient. Such an ideal body is approximately a body of revolution, or a shape that produces a radially symmetric air flow pattern around it, like that produced by a body of revolution. The body of revolution has a body axis that is a fixed line length that is about the same as the vehicle length. This axis is approximately aligned with the vehicle straight travel direction. The body of revolution is constructed by revolving a curve constructed on a plane, where that curve connects to both ends of the body axis. Where the curve is highly optimized for aerodynamic purposes, this produces a highly optimized body shape.

Finally, the narrow form makes it feasible to support this body shape in an elevated position, thus providing free flow aerodynamic conditions that make its very low drag coefficient effective in a road vehicle. Not only can the body of revolution be implemented in a well known, ideal airship shape, but the radially symmetric air flow pattern better enables spreading to the sides compared to flat bottomed shapes, so the required elevation is reduced. Even though the elevation is minimized, the vehicle is still unusually tall and narrow. Stabilizing such a car requires more than conventional automotive methods.

Airship research carried out in the 1920 era provides a high performance aerodynamic body shape that is here used as a carriage to enclose persons riding in the automobile. Wind tunnel tests were carried out in those years producing air drag force measurement data that can be used to design this high efficiency automobile. This data is especially complete for the Akron-Zeppelin shape, even including drag force data for the model at a variety of pitch angles. For vehicle speeds of interest the drag coefficient can be reasonably estimated from this data for scaled models of this shape.

However, the wind tunnel tests were arranged to provide numbers applicable to high altitude flight. While such numbers are applicable for airship operation, ground operation involves a flat surface that disturbs free flow aerodynamic conditions. The effective drag coefficient is substantially increased. Thus, it is important to allow as much room under the carriage for air flow, relative to the carriage, as possible. Although an ideal height is greater than would be possible, an effective approximation to free flow conditions at a highway speed is expected for an elevation equal to half the square root of the projected frontal area. The preferred embodiment is held slightly higher than this rule dictates. This rule is only very rough guidance, which is not intended to be a limitation. It is anticipated that shape refinement will enable tuning of the highway speed that is ideal and extending somewhat the most effective speed range. Obviously, the elevated, nearly ideal body will represent an unusual looking, tall and narrow vehicle.

This shape is well suited for enclosing large people sitting in single file and providing adequate viewing angles, especially when pitched down about ten degrees.

Having arranged for the carriage to have extremely low air drag, the air drag of the lower frames including the wheels becomes significant. An arrangement that provides additional stability, while optimizing the aerodynamic shape of the lower frames, arranges lower frame structural parts, heavy equipment, and wheels in low profile, thin horizontal columns. This is an ideal location for vehicle weight, and it is particularly well suited for holding electrical batteries. Flat motors fit within these columns. These stabilizing effects are important to counter cross wind effects and tilted road surfaces, since these are concerns not dealt with by the stabilizing measures involved in turning. Each such column is enclosed in a covering surface that produces a smooth surfaced, elongated aerodynamic unit that operates like a train. Such a wheel train operates as a unit on each side of the vehicle, and an air flow passage is enabled between the trains. Because each wheel train includes parts from the front frame and parts from the rear frame, it operates as an aerodynamic unit for straight line travel, but is interrupted for turning and other flexing actions. Consequently, fairings are needed to smooth over the gaps that must be present to allow such action.

Special fairing devices have been discovered that are able to make the aerodynamic surfaces nearly perfect. This is an inter-axis fairing concept that enables continuous surfaces to be maintained for straight line travel. Such continuous surfaces would be broken for a variety of flexing and pivoting actions, but they would be reestablished for the shape that mostly prevails in straight road operation. This inter-axis fairing system involves a part that is held between two axes and provides conformal surfaces to parts that hinge on those two axes.

Compared to flat surfaces, the generally cylindrical shape of the carriage provides a significantly reduced drag coefficient in regard to lateral air flow, thus significantly reducing cross wind force effects. This is more of an issue where the axis of the carriage is held with at a small downward pitch angle relative to the horizontal to enhance viewing and headroom. While this increases the height of the carriage at the rear, thereby increasing the lever arm of cross wind force, this can be tolerated because of the low drag coefficient for a cylindrical form.

FIG. 1 shows a frontal view of an elevated airship form of the carriage 31 part of the vehicle. Forward details are emphasized. The width 1 and overall height 2 of this tall and narrow vehicle are indicated. The height extent of the carriage alone 10 is measured as the height of the projected frontal area of the carriage alone. Elevation 3 above the road surface 8 is also shown. Place holders for a driver 4 and a passenger 5 are shown riding in tandem, as viewed through lower front window 6 and upper front window 7. Struts 9 attach to wheel trains 34 to hold the carriage 31 well above the road surface. The low profile wheel trains 34 are seen in frontal view, with front wheels 11 that are mostly enclosed in the wheel trains 34, protruding sufficiently to operate on the road surface 8. One of six electric motors 13 can be seen in proximity to the left front wheel 11. The airfoil shaped, front cross beam 14 is a thin horizontal panel that spans between the wheel trains 34, and provides frame rigidity. Another horizontal panel 15, also to be shaped as an airfoil, can be seen here, even though it is near the rear of the vehicle. Other details pointed out include pitch hinging mechanism 24, straps 16 to hold the vehicle rigid, tracking frame attachment arms 19, airfoils supporting a fairing shell, tracking frame structure 17 utilizing airfoils shapes, brace and fairing 23 for pitch hinging mechanism, another fairing shell support 401, and a hinge pin 402 that connects the individual wheel suspension mechanisms to the wheel train 34 structure.

The key performance feature, low aerodynamic drag force, is determined by the projected frontal area, which is the outline area of the carriage 31 as shown in this view, in combination with the very low drag coefficient of the airship body form.

Figure 2:
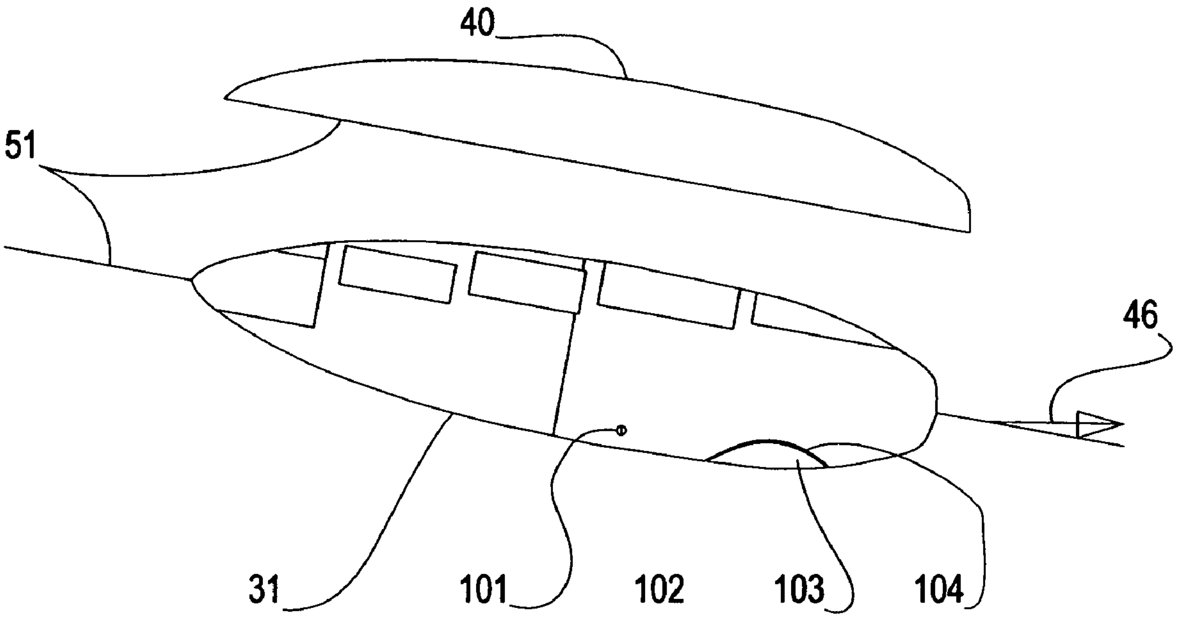
FIG. 2 Formation of airship as a body of revolution defined by a revolved curve.

FIG. 2 shows the Akron-Zeppelin defining curve 40 spanning an axis line 51. When revolved about that axis line 51, this defining curve produces the carriage shape. With appropriate scaling to the automotive purpose, and addition of windows and other details, it becomes the carriage 31 part of the vehicle. The vehicle travels to the right in this illustration for forward travel 46. This is then set at a fixed pitch angle 45; a minor variation that helps with headroom. This carriage part of the vehicle is shown as an isolated part here, but the relationship of it to the remainder of the vehicle keys on the pitch hinging axis 101 and the yaw hinging axis 102. The entire carriage body is a rigid unit except for a cut out surface 103 that is fixed to one side of the yaw hinging mechanism, while the carriage 31 is fixed to the other side of that mechanism. A very small gap 104 is shown that is a very small interruption in the otherwise smooth surface of the airship shaped body, except when an actual vehicle turning operation is under way.

Figure 3:
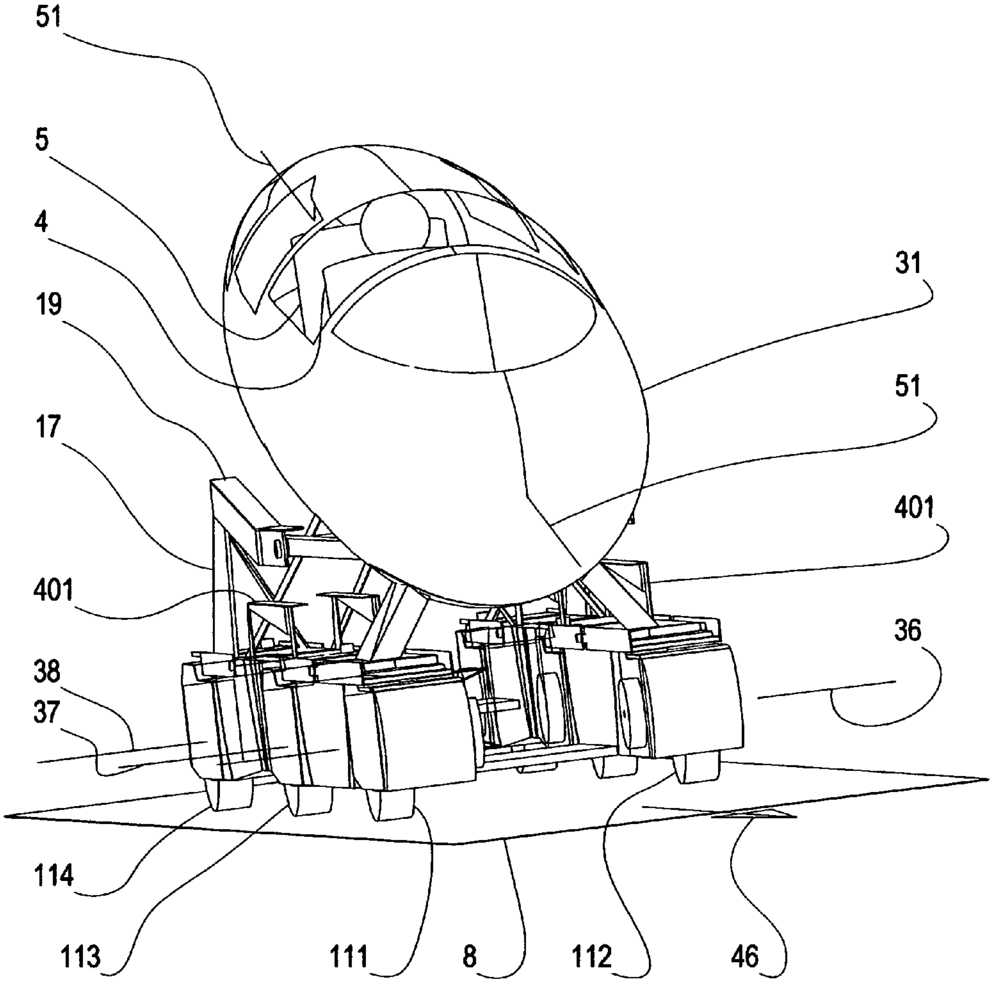
FIG. 3 Dynamic view of elevated airship showing three axles and wheels on roadway.
Figure 5:
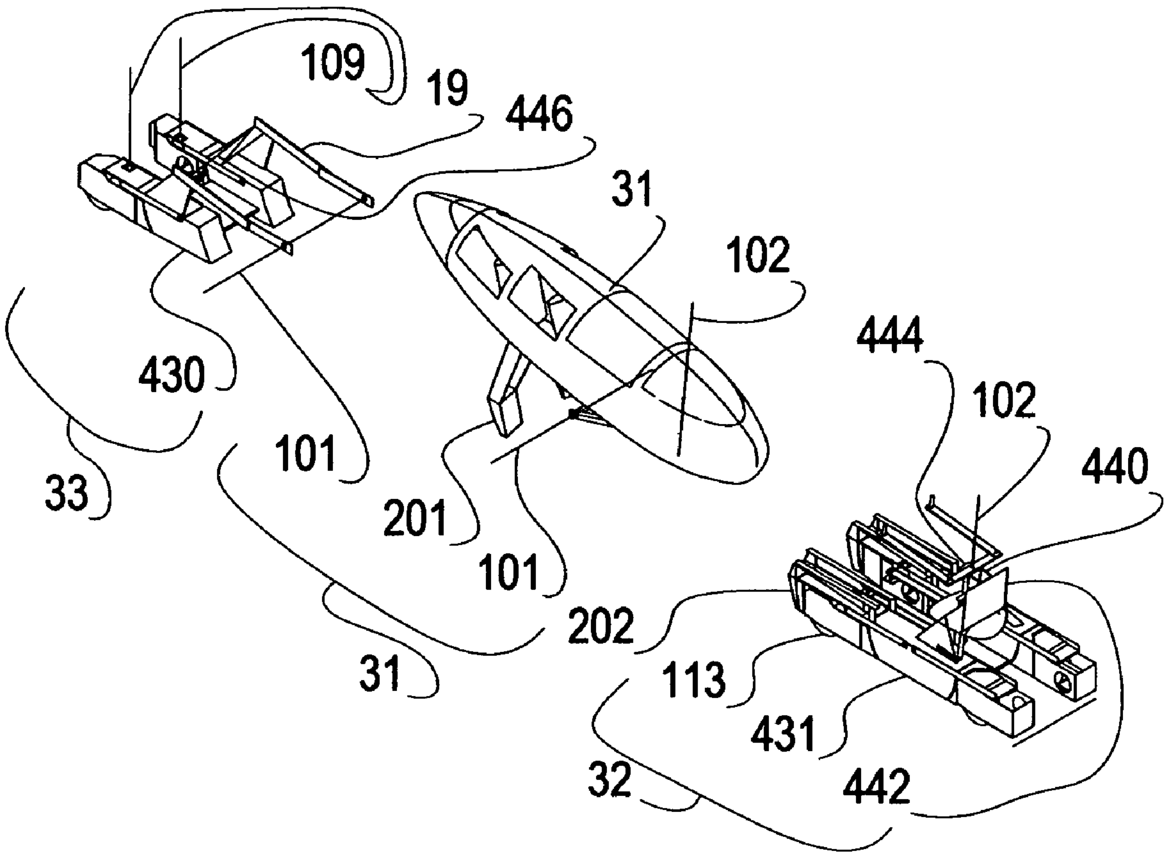
FIG. 5 Separated frames of three frame vehicle.

FIG. 3 illustrates the front axle 36, the middle axle 37, and the rear axle 38, with the forward travel direction indicated by the arrow 46. The three frame system is defined by these axles, with the front axle 36 and the middle axle 37 being part of the control frame, and the rear axle 37 being part of the tracking frame. FIG. 5 is a clearer picture of these parts, with the control frame 32 and the tracking frame 33 shown separated. The carriage frame 31 is the body of revolution form 31 first shown in FIG. 2. Six wheels can now be seen in relation to the roadway plane 8. The two front wheels 111,112 guide the final turning action of the vehicle. These wheels are fixed on the front axle such that wheels and axle change direction as a unit. The right control wheel 113 and the right rear wheel 114 are pointed out here. Note that the axles are the center lines of wheel rotation for straight line travel, but when wheels pivot in turning action this is not the case. Attachment structures 17,19 are part of the tracking frame.

Figure 4:
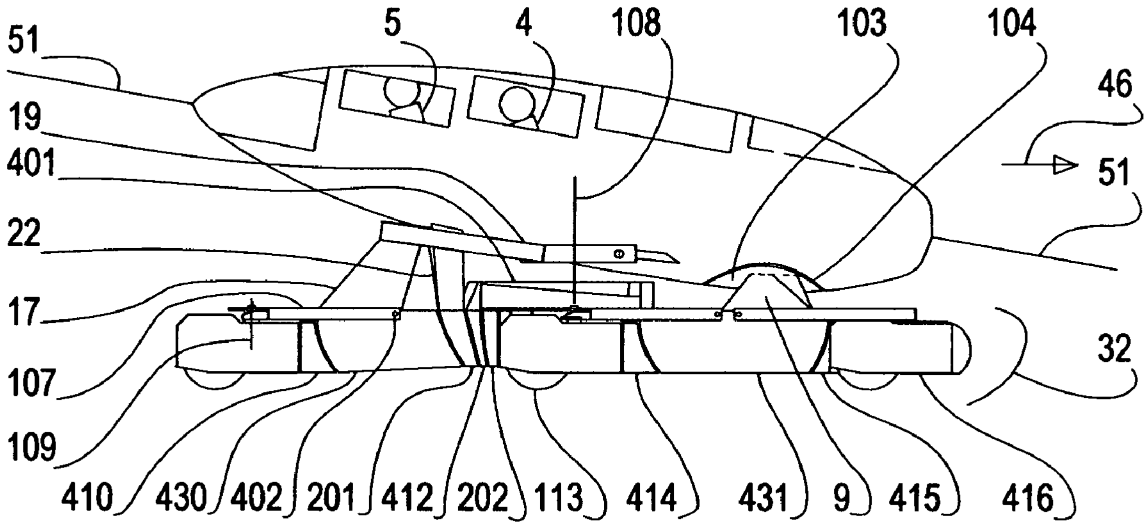
FIG. 4 Three frame vehicle with parts detailed.

FIG. 4 shows a side view where stabilizing system parts can be more clearly pointed out. Driver place holder 4 and passenger place holder 5, body of revolution axis 51, and travel direction indicator 46 orient the view. The side view of the struts 9 shows how these connect between the carriage and the structure below. At the top, the struts 9 attach through a cutout 103 from the carriage body shell, to internal structure of the carriage to be shown later. The cutout provides a small gap 104 that provides an aerodynamic smooth body of revolution when the vehicle is traveling straight.

The structure below that the struts 9 attach to, on the side that can be seen, is part of the right side wheel train. From the pitch hinging mechanism 24 shown in FIG. 1, a bent horizontal arm 19 and other structure connects to wheel train structure toward the rear of the vehicle. Each wheel enclosure is connected to a horizontal pivot axis by a suspension arm, as shown by arm 107 and horizontal pivot axis 402. The middle wheels are control wheels, with the right side control wheel 113 here visible. The middle wheels are mounted at the middle axle 37 such that they are allowed to pivot about a vertical pivot axis 108. Other details include the tracking frame attachment structure arm 401, fairing support airfoils 22, tracking frame structure airfoils 22, tracking wheel suspension arm 17, hinging at pin 402, and a rear wheel pivot axis 109 that enables rear wheel steering as a backing aid.

The wheel train is a combination of wheels and motors in enclosures, battery compartments, and fairing devices. The right side wheel train 34 show here has an involved set of fairings that make it a smooth aerodynamic unit for forward travel, yet allow various actions needed for road operations. A rear fairing shell 410 enables smooth action of the rear suspension device in relation to a rear battery compartment 430. This rear fairing shell 410 is attached to the rear suspension arm 17. Its front and back surfaces enable rear wheel turning and suspension action, yet maintain aerodynamic smoothness. Note that the fairing shells here discussed are not actually blocks as shown, and that only the external surfaces actually exist. A pitch action fairing shell 201 is held by the supports 22 in fixed relationship to the carriage frame such that pitch hinging action is allowed for uneven road surfaces, but returns the wheel trains to a smooth aerodynamic condition for level road conditions. A yaw action fairing shell 412 acts similarly in turning operations. Its rear surface mates approximately, with very small gap, with the front surface of the pitch fairing shell 201 when the wheel train is in a straight condition. The front surface of the yaw action fairing shell 412 similarly mates with the control wheel rear fairing shell 202, allowing the suspension device for that wheel to act. The yaw action fairing shell 412 is held rigidly to the control frame structure by the support arm 401. The control wheel enclosure is shaped at the rear to mate well with the control wheel rear fairing shell 202. Other fairing shells 414,415 function with respect to battery box 431, similarly to functioning of the rear fairing shell 410. The front wheel enclosure 416 is the only one of six that is identified.

FIG. 5 shows the three frames of the vehicle separated for viewing clarity. Each individual frame operates as a rigid structure with the exception of control wheel 39 pivoting action and small angle flexing necessary for individual wheel spring suspension devices. Rear wheels are also fixed to enable pivoting about vertical axes 109 to facilitate an important secondary function of backing the vehicle. The control frame 32 connects to the carriage frame 31 through the yaw hinging axis 102 and the tracking frame 33 connects to that carriage frame 31 through the pitch hinging axis 101. This arrangement enables a nearly ideal airship form without significant interruptions of the ideal surface. The gap 104, visible in FIG. 4, becomes a significant surface interruption only during turns, since it closes to a very small surface gap when straight line travel resumes. The wheel train parts are separated for viewing clarity here also, but when the frames are joined through the hinging axes, the wheel trains also form horizontal columns having smooth surfaces that are minimally interrupted for straight line travel of the vehicle. Fairing mechanisms needed for this action include a filler block 201 shown here as a solid, shaped block. Actual implementation of this block is anticipated to not actually fill the block, but only maintain the outer surfaces that become part of the outer wheel train fairing surfaces.

FIG. 5 also shows a brace 442 that helps hold the post 440 that, in turn, supports bearings that maintain a fixed orientation of the near vertical yaw axis 102 with respect to the control frame, thus controlling the carriage frame 31 orientation. Only yaw hinging is enabled by this arrangement; neither pitch hinging nor roll hinging are allowed. This serves to enable a clean body of revolution as the carriage 31 and to provide stabilization of the relatively high vehicle. Bracing 446 of the tracking frame keeps it an approximately rigid structure. The pitch hinging relationship about the pitch axis 101 between the tracking frame 33 and the carriage frame 31 similarly enables only relative pitch hinging. Thus, the carriage is controlled to hold toward the inside of a turn.

Figure 6:
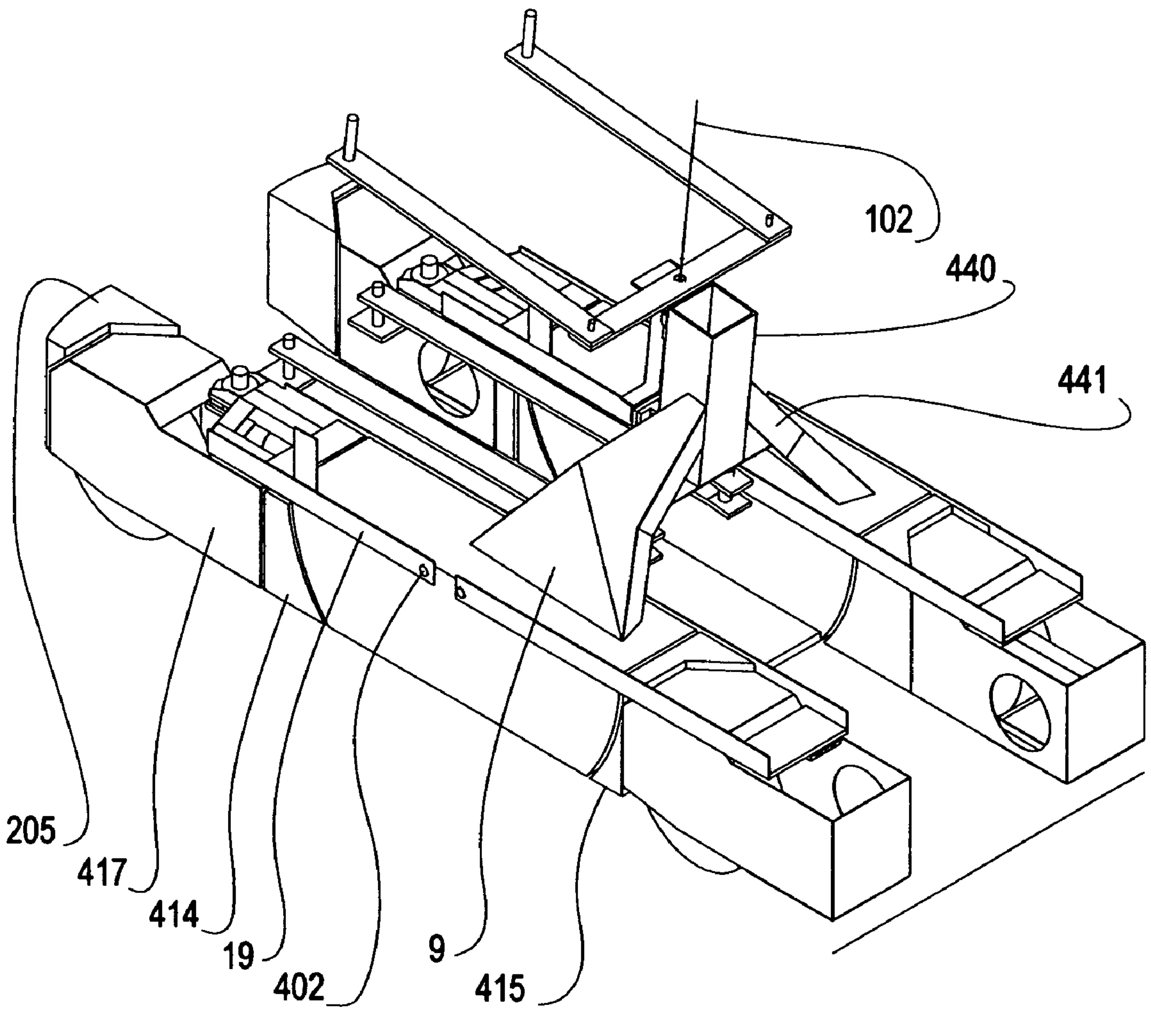
FIG. 6 Structure and functional details of control frame from three frame vehicle.

FIG. 6 shows further detail of the control frame, particularly the structural tie in 441 of the struts 9. It also continues the discussion of the fairings in the wheel train system. Shaping of a wheel enclosure 417 is accomplished by a block 205 that is fixed to that adjacent wheel enclosure, where the block provides a surface at its rear side that mates with the forward surface of the following block 202 seen in FIG. 5. Another filler bock 206 functions similarly, allowing angular motion of the suspension arm 306 about its hinging pin 307.

Figure 7:
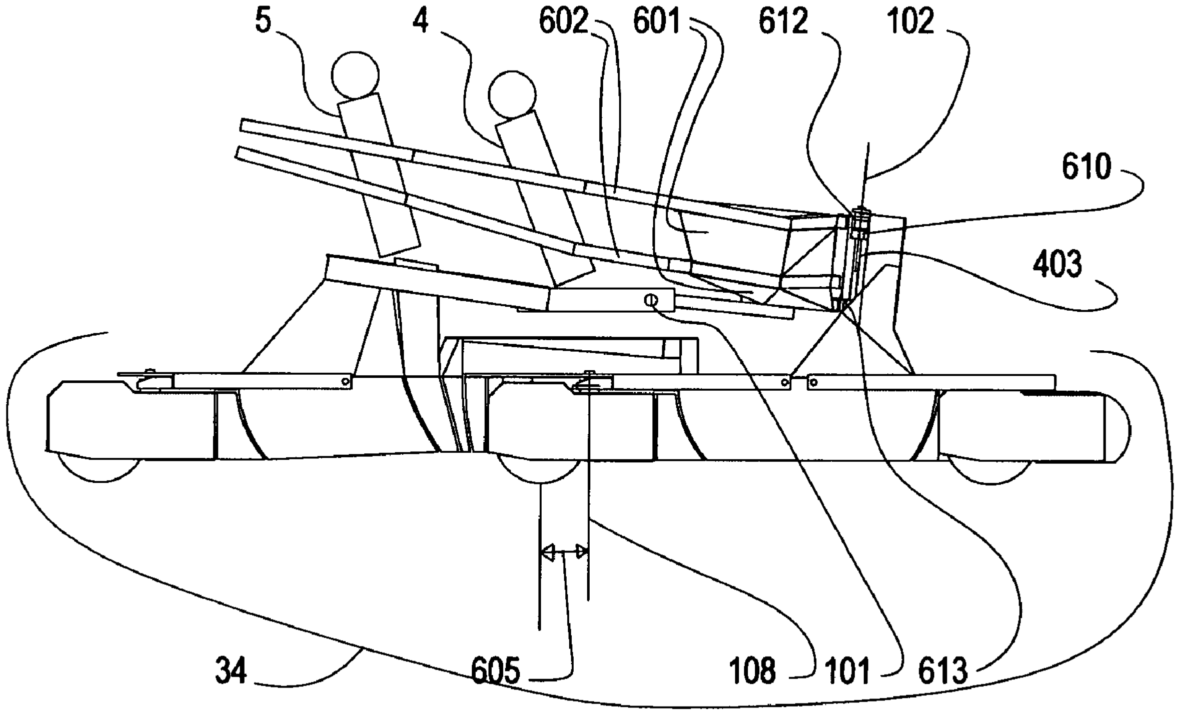
FIG. 7 Articulated joint between internal carriage structure and control frame structure.

FIG. 7 shows the tie in to the carriage internal structure 602. Here the view of the internal structure 602 is enabled by removing of the outer carriage body surface. Viewing orientation is provided by the driver place holder 10 and the passenger place holder 604. The carriage internal structure 602 is made rigid by the box beams shown as well as the unit body effect of the outer carriage shell. The carriage internal structure also includes a rigid tie in 620 to the pitch hinging axis 101. The key bracing structures 601 prevent roll motion between the pitch hinging axis 101 and the yaw hinging axis 102 and also help make the body framing rigid. The yaw hinging mechanism is centered on the near vertical shaft 403 that turns freely relative to the carriage structure 602 and, hence, the carriage 31. Bearings 612,613 fixed on the carriage structure enable this relative motion. The shaft 403 also turns freely relative to the control frame 32, with bearings 610,611 enabling this motion. The shaft 403 is a strong cylinder capable of carrying significant roll angle torque and pitch angle torque from the control frame 32 to the carriage 31, such that relative roll motion and relative pitch motion are blocked. However, the shaft 403 also is part of the turning linkage, to be discussed next. That pitch hinging action enables relative pitch angle variation between the carriage 31 and the tracking frame 33. The tracking frame also provides roll control of the carriage 31 by blocking relative roll motion between the carriage and the tracking frame 33. The vertical pivoting axis 108 of the control wheel 39 is shown offset from the road contact point for that control wheel 39. This offset is a caster effect arrangement. Caster offset 605 is also shown here.

FIG. 7 also clearly identifies one of the low profile wheel trains 34 that extend the full length of the vehicle. Each of these encloses three wheels on each side, along with batteries, significant structure and electric motors fitted with chain drive and sprockets on the motors and wheel drums.

Figure 8:
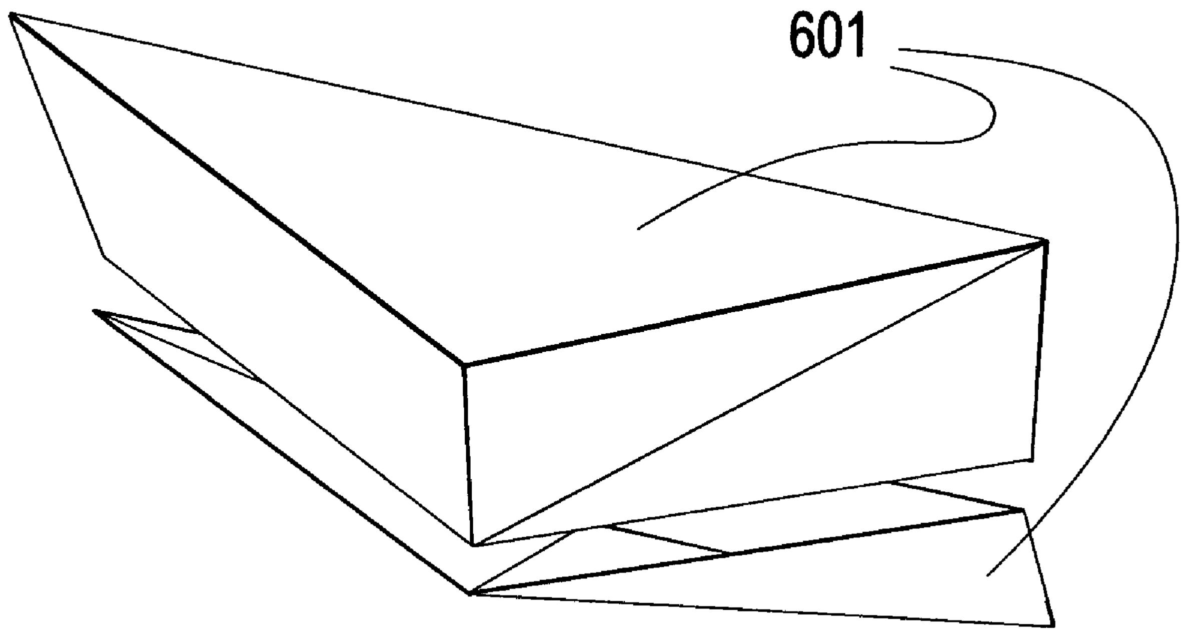
FIG. 8 Brace to assure rigidity of control frame and connection to carriage shell.

FIG. 8 shows bracing that relates to FIG. 7. This bracing ties the carriage internal structure 602 and the structural connection 620 to the pitch hinging axis 101 mechanism together and locks these to the yaw hinging axis 102 mechanism. These are formed of metal panels welded into rigid structures. This is a representative way to achieve the intended rigidity.

Figure 9:
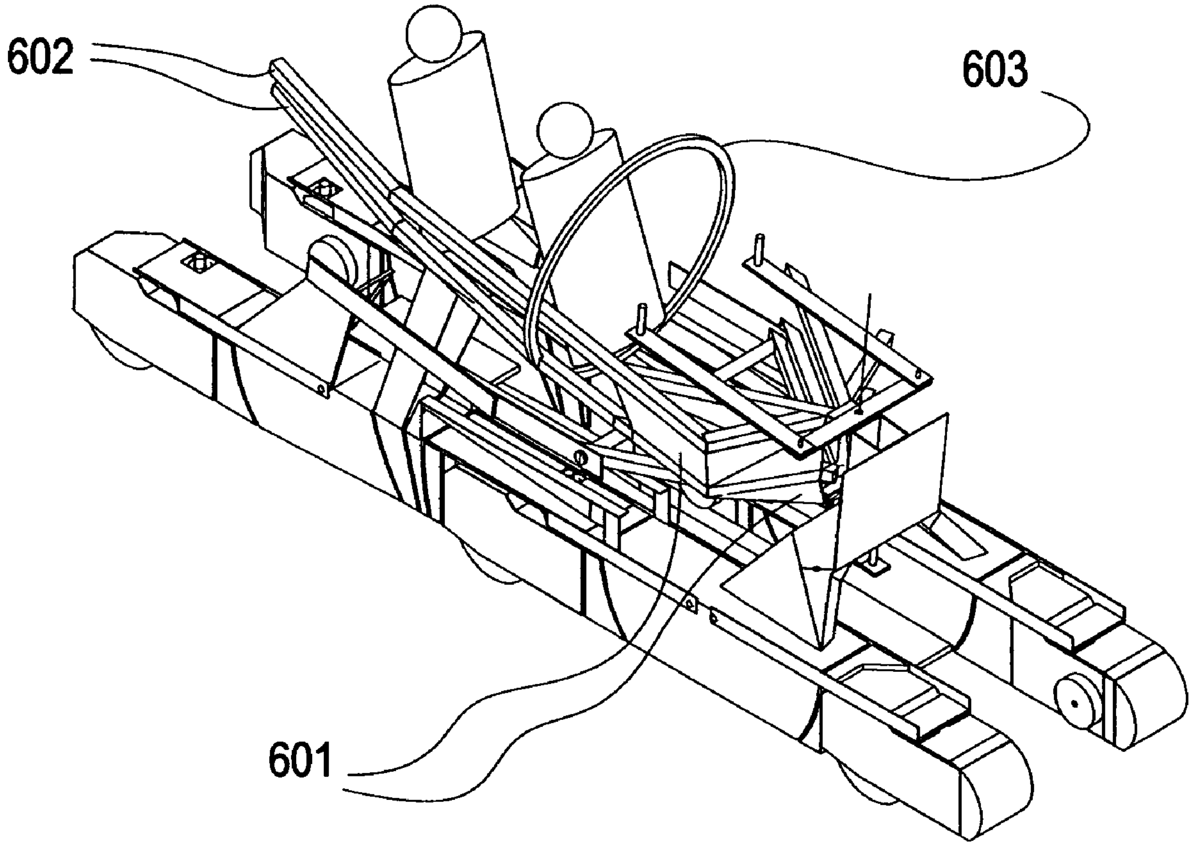
FIG. 9 Three frame vehicle with carriage shell removed.

FIG. 9 shows the method of fixing the carriage internal structure 602 in relation to the carriage 31. Only one side of the internal structure 602 is shown. The framing hoop 603 shown is one of multiple such hoops that form the body of revolution shape that gives the intended aerodynamic performance. Such frames tie in to the unit body of the carriage shell.

Figure 10:
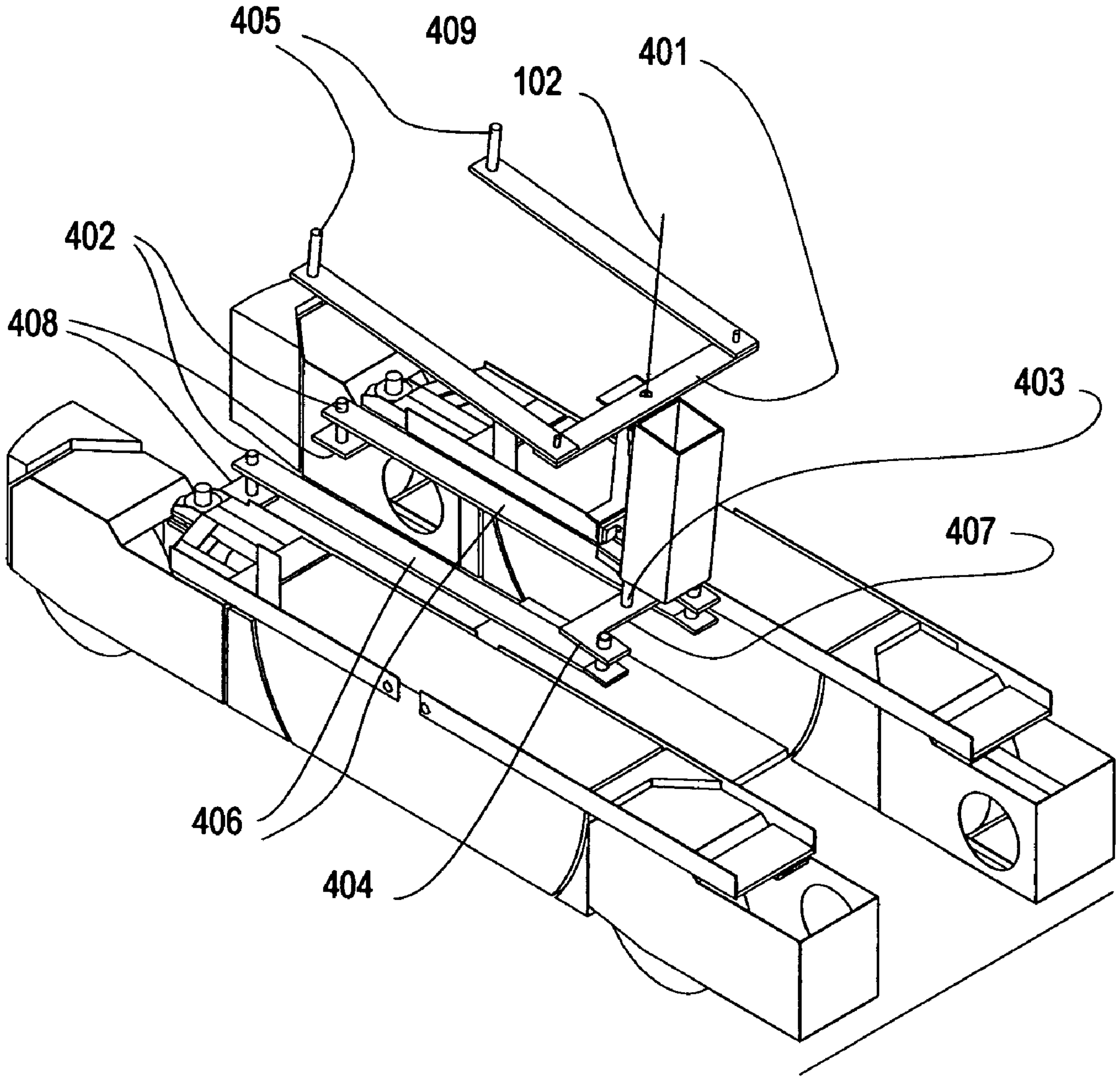
FIG. 10 Control frame including steering linkage, with extension into carriage space.

FIG. 10 illustrates the steering linkage between the driver and the control wheels. Parts shown here operate in respect to the control frame structure, although handles 405 link to a driver who is generally fixed relative to the carriage 31. Control arms 409 pivotally link to cross arm 401 which is fixed on a near vertical shaft 403 that carries torque to the lower cross arm 407 that is also fixed on that vertical shaft 403. The lower cross arm 407 is similarly, pivotally linked to lower control arms 406 that are pivotally linked to lever arms 408 that are positioned to enable forcing control wheels such as the visible wheel 39 to pivot. The lower cross arm 407 is shaped with an offset 404 to slightly vary the angle between the two control wheels for larger turning angles.

Figure 11:
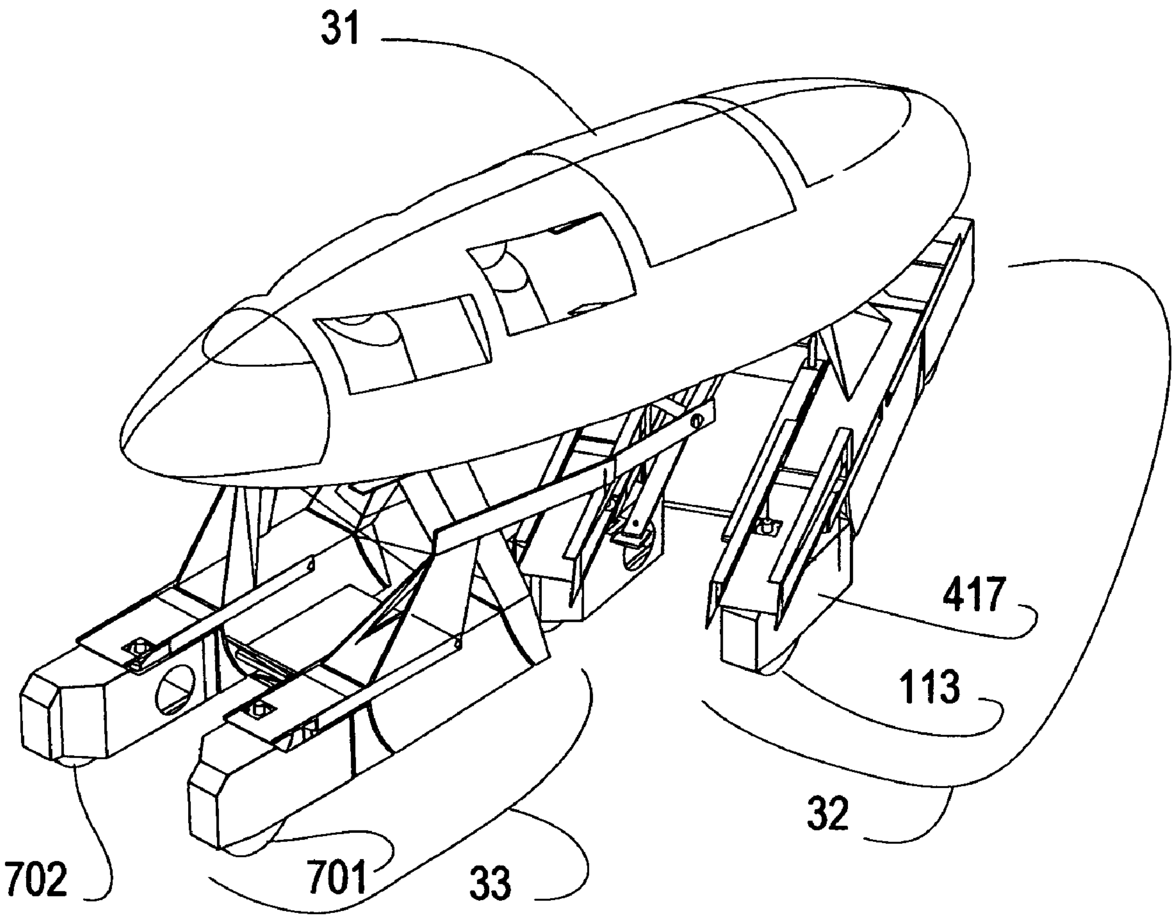
FIG. 11 Three frame vehicle in turning operation.

Turning action is illustrated in FIG. 11. A left turn operation is shown underway. The control wheels, as demonstrated by the visible, right side control wheel 113, are shown having pivoted relative to the control frame 32 and forward motion has caused that control frame 32 to turn to move along a turning path. The carriage 31 allows that turning action by the control frame 32, though it is prevented from immediately changing direction by the tracking frame 33. However, because the front wheels are rigidly linked to the control wheel position, and that control wheel position has been forced laterally toward the outside of the turn by the pivot action and forward travel of the control wheels, the carriage is then forced to turn to follow the travel of the front wheels. Because at least one of the rear wheels 701, 702 maintains good road contact, the tracking frame 33 and the carriage 31 follow the yaw axis like a trailer follows a trailer hitch on a car. The tracking frame 33 holds the carriage 31 toward the inside of the turn, which is on the left in this illustration. The control wheel 113, which is on the right in this illustration, is well positioned on the right side. Because it is significantly extended toward the outside of the turn, it acts on a lever arm, creating a roll torque that counters the radial acceleration effect of the turning carriage 31.

The right control wheel 113 is mostly within an enclosure 417 that pivots to force pivoting of the right control wheel 113.

The tracking frame 33 does not provide vertical support for the carriage 31 because of the pitch hinging axis 101. Therefore, the control wheels must be positioned sufficiently rearward, relative to the weight distribution throughout the vehicle, so that the carriage 31 does not tip over backwards. The pitch hinging axis 101 must also be appropriately positioned relative to this need.

Aside from action that stabilizes the vehicle, the steering system itself is a dynamic control system, where the control input is the steering angle set by the driver. The turning of the control frame 32 is a response that continues until that control frame is oriented to match that set steering angle. At that point the control wheel 113 is in a straightened pivot angle, and the control frame 32 adheres to a straight path. An issue arises with such a system, where the control frame 32 has significant mass that can lead to dynamic instability. As the control frame swings to its straight position, it is possible that an overshoot will occur that the driver will find difficult to control. The caster offset 605 of the control wheel cannot be large, otherwise it will difficult for the driver to prevent that overshoot. Reducing the caster effect offset gives the driver a stronger control effect. Spring action in the steering linkage can also contribute to instability of the steering system.

Figure 12:
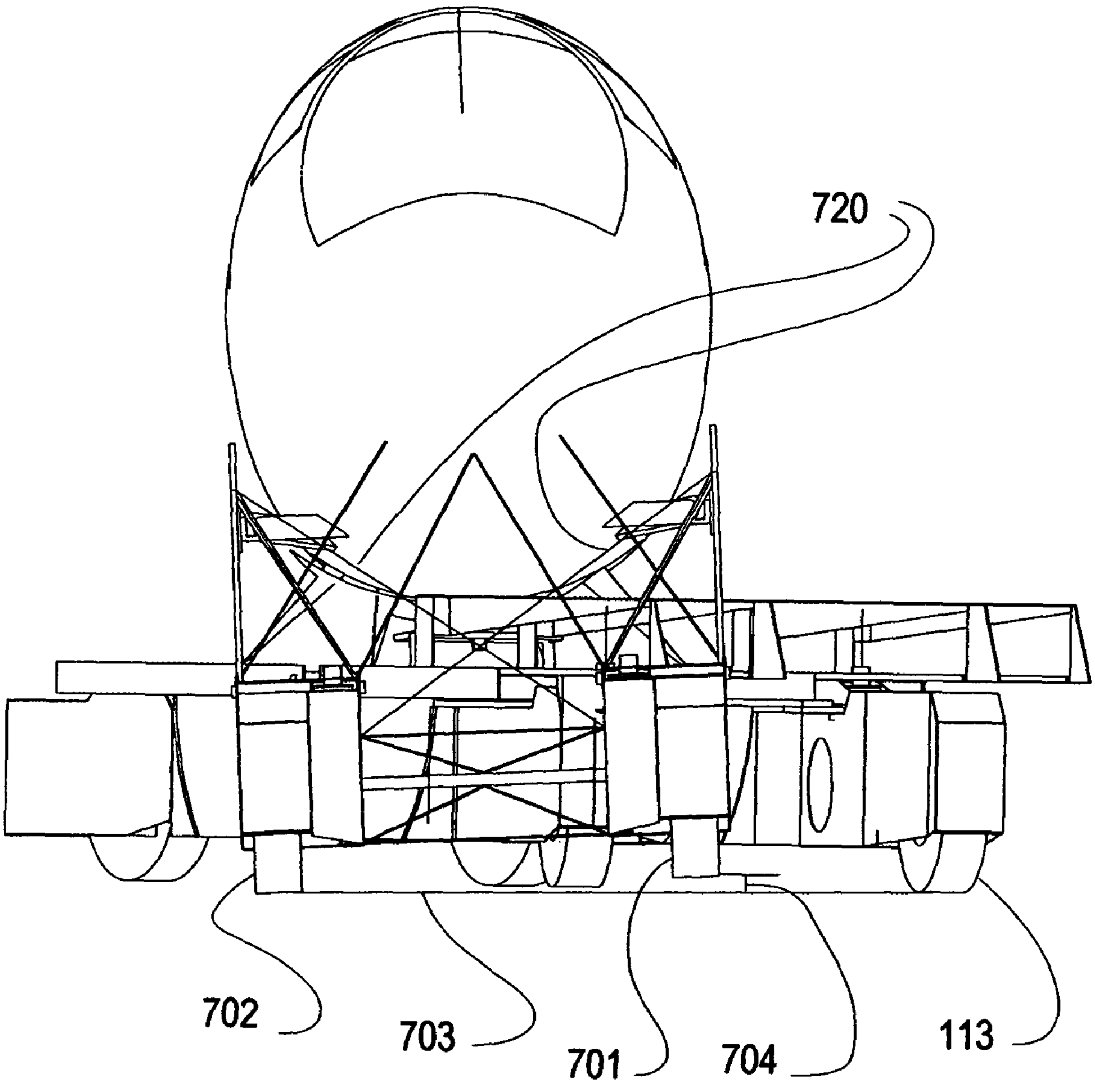
FIG. 12 Stabilizing and tilting effects of three frame articulated stabilization system.

Tilt effect due to a tilted yaw hinging axis 102 can be seen in FIG. 12 where the right rear wheel 701 can be seen to be higher 704, relative to a horizontal line 703, than the left rear wheel 702 during the left turn according to the example of the previous figure. This lifting is made visible by keeping the individual wheel suspension actions inoperative, such that there is full rigidity in the vehicle, except for the yaw hinging, the pitch hinging, and the control wheel pivoting actions. The lifting of that right rear wheel 701 is a visible indication of the vehicle tilt that affects the carriage 31 tilt as well. Driver and passenger comfort in turning is enhanced by this tilt which is toward the inside of the turn of this example. Bracing cables 720 show the effect of these in making the tracking frame rigid. Note that in actual operation, the suspension devices at each wheel will seek a balance such that the right rear wheel 701 does not actually lift as shown.

A further detail is that the front wheels are positioned somewhat forward of the near vertical yaw axis such that a variety of possible driving conditions can be dealt with. This was included in response to a concern for excessively banked turns where the vehicle speed was not sufficient to prevent roll over to the inside of the turn. This concern is addressed by appropriate placement of the front wheels relative to the yaw hinging pivot point so as to cause them to extend in a direction opposite that of the control wheels.

A further stabilizing effect is provided by wheel trains that include wheels and heavy equipment, enclosed in horizontal columns. These are held separate from the carriage. The weight distribution inherent in the wheel train arrangement provides favorable mechanical dynamic effects, stabilizing against transient side forces especially well.

Ramifications

The articulated vehicle wheel system disclosed in U.S. Pat. No. 7,338,061, Bullis, Mar. 4, 2008, eliminated dependence on a low center of gravity and a wide wheel base to stabilize vehicles with a two frame vehicle connected with an articulating joint. The present invention discloses a three frame system, where a first frame is connected to a second frame with an articulating joint, and the second frame is connected to a third frame with an articulating joint. Both inventions relied on articulating joint action that held the vehicle parts fixed in roll angle relative to any other part. This enabled prevention of vehicle roll over by the wheel system operation. In this operation, the control wheel pivots in response to driver action. Then it extends on the outside of the turn at the same time as it forces the front wheels of the vehicle to turn. Thus, the stabilizing action is coordinated with the turning action. Variations of this are possible, including linking the control wheel extension mechanism to a rear wheel as well as the front wheels. In any case, it makes a tall and narrow vehicle possible.

However, not only does a higher center of gravity enable a tall and narrow vehicle, it also enables an elevated vehicle, where the carriage body is elevated above the ground giving substantial ground clearance. It is now clear that this ground clearance is important for other purposes that go beyond the need to clear obstacles or uneven places on the road. The preferred embodiment earlier discussed is an example. Another is a military vehicle giving protection from explosive devices in a roadway, where soldiers are carried at a height that significantly separates them from the source of explosion and the height allows for armor structure between soldiers and that source. That armor can be wedge shaped to provide a blast splitting effect. A further benefit of the elevation capability is that thin struts can be used to separate the carriage from the lower, supporting structures, such that shapes can be utilized that operate independently.

Operation of the wheel system is enabled by the articulating action of the vehicle. This articulating action is needed to assure that essential wheels remain in contact with the ground. Because it requires hinging between vehicle parts, there is a present design issue that clearance must be maintained as these parts hinge on each other. This affects the detailed shaping of the vehicle frames, as well as the layout of the carriage interior and the positioning of other equipment. A fortunate benefit of elevating the carriage is that it eases design of the system where the control wheels must pass under the carriage as they operate to provide the stabilizing and turning actions. Because of these considerations, a variety of articulating arrangements have been examined. They are significantly different in structure, but all enable the underlying wheel action.

Many refinements are envisioned. These include steadying bars, attached at the rear of the airship carriage, extending to the tracking frame. Such steadying bars would minimize bobbing and swaying at the rear of the airship carriage. Back wheel turning is also envisioned to aid in parking, reduce turning radius, and aid in general backing operation. Rolling resistance of tires is an ultimate issue, and it is known that large diameter tires offer some advantage. There is a need to keep the control wheels small such that the carriage body does not interfere with them. The inclined yaw hinging axis, now used to tilt the carriage in a turn, can be used to vary downward force on the control wheels, such that they are lightly loaded for straight line travel and more heavily loaded during a turning action. Because rolling resistance is roughly proportional to downward force of a load, it would be minimized for straight line travel. Also envisioned is a mechanism whereby a steady yaw hinging angle would be set as an offset that would result in straight line travel with front wheels extended to one side and control wheels extended to the opposite side. Also envisioned is tuning of the vehicle shapes somewhat like tuning of a sailboat shape to compensate for its fixed keel. Tuning also has a potential benefit in minimizing what remains of the roadway surface effect as far as distortion of the free flow aerodynamic pattern. It is known that airspeed close to an aerodynamic body is about that of the body, but tapers off as a function of separation distance. This tapering is very slow at low vehicle speeds, it more rapidly reverts to the surrounding environment air speed at higher vehicle speeds, and at yet higher vehicle speeds, it actually goes negative before reverting to the surrounding environment air speed. Because of this there is a potential opportunity for special shape tuning to set the taper function for the most useful speeds. Active tuning, where a shaping surface is adjusted as a function of speed, is a further possibility.

Other refinements include variations in the implementation of the linkage that controls the control wheel angles, and such could include hydraulic, or electric mechanisms.

This description has shown examples of the invention. As such it demonstrates a concept that is expected to have many variations. The appended claims should determine the scope of this invention, rather than the examples given.

I claim:

1. An articulated vehicle for operation on a roadway, that includes a carriage to enclose objects to be transported, said carriage having an external shape that is characterized by a free airflow pattern that would occur in absence of any external surface that affects airflow, a control frame having two front wheels, and two pivotally mounted control wheels that are mounted rearward on said control frame, and a tracking frame having two rear wheels, where said tracking frame is rearward of said control frame, where wheels are attached to frames such that three wheels operate in a column on each side of said articulated vehicle, and equipment is configured along said column to create a wheel train, where wheel trains result in minimized projected frontal area of said frames, structure that connects from each frame to said carriage to hold said carriage at an elevated position above said roadway, where said structure is configured as an articulating linkage that enables relative hinging between said carriage and said control frame about a yaw hinging axis and relative hinging between said carriage and said tracking frame about a pitch hinging axis while preventing relative hinging action between frames about a roll hinging axis, and a linkage from said carriage to said control wheels that is configured to enable control of pivot action of said control wheels, where operation of a forward moving said articulated vehicle includes an aerodynamic function where said elevated position enables an air flow pattern about said carriage approximating said free air flow pattern, an aerodynamic function where minimized said projected frontal area of said frames results in lower aerodynamic drag force on said frames, pitch hinging action that maintains a front wheel, a control wheel, and a rear wheel in firm contact with said road surface, thus accommodating uneven surfaces of said roadway, yaw hinging action, where driver action through said control linkage adjusts travel direction of said control wheels, where a changed travel direction causes lateral motion of said control wheels that causes said yaw hinging action, thus setting said front wheels to make a turn, where a simultaneous effect of said yaw hinging action is that a control wheel is caused to extend laterally toward an outside of said turn, thus setting a stabilizing stance, articulated operation where said stabilizing stance acts through roll preventing linkages to prevent rollover, and and articulated operation where said narrow carriage then follows said turning travel direction of said front wheel, with said rear wheel tracking to hold said narrow carriage toward an inside of said turn.

2. An articulated vehicle according to claim 1, where said carriage and said stabilizing system are integrated such that said external shape is maintained for straight line travel of said vehicle.

3. An articulated vehicle according to claim 1, where said air flow pattern includes a significant amount of displaced airflow that passes under said articulated vehicle that is enabled by said elevated position.

4. An articulated vehicle according to claim 1, where said structure includes struts that connect between said carriage and said wheel trains, where said wheel trains are low profile wheel trains that are formed as aerodynamic entities that include wheels that are in line on each side with interspersed equipment and structure, where said low profile wheel trains include aerodynamic fairing provisions that provide for approximately continuous outer surfaces, thus enabling a said wheel train to function as a single aerodynamic entity.

5. An articulated vehicle according to claim 1 where said carriage has a height and a width that are approximately equal.

6. An articulated vehicle according to claim 1 where said narrow carriage has a height and a width, where said height is greater than said width.

7. An articulated vehicle according to claim 1 where said carriage is shaped similarly to an airship.

8. An articulated vehicle according to claim 1, where a seating arrangement is provided that is single wide, where said vehicle is not wider than necessary to provide such said seating arrangement.

9. An articulated vehicle according to claim 1 where said carriage is a body of revolution having a longitudinal axis approximately aligned with travel direction of said vehicle.

10. An articulated vehicle according to claim 1 where said carriage is a body of revolution having a longitudinal axis approximately aligned with travel direction of said vehicle, except said longitudinal axis is at a pitch angle where said vehicle is pitched at a downward angle.

11. An articulated vehicle according to claim 1 where said narrow carriage is a tapered cylindrical shape that presents a low drag coefficient to high velocity cross winds.

12. An articulated vehicle according to claim 1, where said external shape minimizes airflow in a downward vertical direction, and said narrow vehicle has an approximately flat bottom such that air passing under said narrow vehicle is approximately the same as undisturbed surrounding air.

13. An articulated vehicle according to claim 1 that includes operation as a mechanical control system, where said linkage is a mechanical linkage where a driver actuated control displacement of said linkage causes said control wheel to pivot in a first angle, relative to said control frame, to set said travel direction of said control wheel, where said lateral extension of said control wheel is a reaction displacement that causes said control wheel to pivot in a second angle, relative to said control frame, that is opposite to said first angle, whereby said mechanical control system acts to make a summation of said first angle and said second angle equal to zero, such that said mechanical control system sets a completed travel direction of said control frame that matches said control displacement.

14. An articulated vehicle for road transportation purposes, that includes an articulating stabilization system that includes a control frame, a tracking frame, and a linking frame, where articulating joints between frames block relative roll motion between frames, and a three axle wheel arrangement having two wheels at each axle, where a front axle and a middle axle are part of said control frame, and a rear axle is part of said tracking frame, and said control frame is connected with yaw connecting structure through a near vertical yaw hinging axis to said linking frame, where said linking frame is a structural part of a carriage that encloses subjects to be transported, and said carriage is connected with pitch connecting structure through a transverse and horizontal pitch hinging axis to said tracking frame, where said pitch hinging axis enables vertical motion of said tracking frame to enable a rear wheel to stay in firm contact with said roadway while allowing a middle wheel and a front wheel to maintain firm contact with said roadway, and where said yaw hinging axis enables a front wheel to pivot about said yaw hinging axis to change its travel direction, and a pivotal mounting enables a middle wheel, that is a control wheel, to pivot to change its travel direction, where a first linkage is included that provides a connection that enables a driver to change travel direction of said control wheel, and said control frame acts as a second linkage whereby lateral extension of said control wheel to determines travel direction of said front wheel, and a wheel train of wheels such that for a straight travel path, three wheels are in a column aligned parallel to said path on each side of said articulated vehicle, where operations include a turning operation that is a multiple action that simultaneously stabilizes and turns said vehicle, where turning is in response to a control action that adjusts travel direction of said control wheel through action of said first linkage, such that forward motion causes said control wheel to laterally extend toward an outside of a turn, thus setting a stabilizing stance, while said control wheel, by extending, acts to set a turning travel direction of said front wheel through action of said second linkage, where said linking frame then follows said turning travel direction of said front wheel, with said rear wheel tracking to hold said linking frame toward an inside of said turn.

15. An articulated vehicle according to claim 14 where said carriage is an enclosure for subjects to be transported, where said subjects include a driver.

16. An articulated vehicle according to claim 14 where said carriage is an enclosure for subjects to be transported, where said subjects include persons, where seating for said persons is only single file seating.

17. An articulated vehicle according to claim 14 where said carriage is an aerodynamic body having a shape similar to that of an airship.

18. An articulated vehicle according to claim 14 where said carriage is an aerodynamic body, where said yaw connecting structure and said pitch connecting structure act as struts whereby said aerodynamic body is elevated to enable a free airflow pattern similar to that which would occur if there were no surface external to said aerodynamic body that affects airflow.

19. An articulated vehicle according to claim 14 where said carriage is an aerodynamic body, where said yaw connecting structure and said pitch connecting structure act as struts connecting said aerodynamic body to said wheel trains, whereby said wheel trains are formed as separate aerodynamic entities that include aerodynamic fairing provisions that provide for approximately continuous outer surfaces.

20. An articulated vehicle according to claim 14 where said carriage is an aerodynamic body, where said yaw connecting structure and said pitch connecting structure act as struts connecting said aerodynamic body to said wheel trains, whereby said wheel trains are formed as separate aerodynamic entities that include wheels that are in line on each side with interspersed equipment and structure that includes an electric drive system where batteries and electric motors, where said wheel trains are parallel, separated, horizontal.

21. An articulated vehicle according to claim 14, where wheels at said rear axle are mounted to enable pivoting which enables rear wheel steering as an added capability of said articulated vehicle.

22. An articulated vehicle according to claim 14, where wheels at said rear axle are mounted to enable pivoting that is linked to said control frame such that said laterally extended said control wheel also determines travel direction of said wheels at said rear axle, thereby enabling rear wheel steering action as an added capability of said articulated vehicle.

23. An articulated vehicle for operation on a roadway under control of a driver, that includes a carriage to enclose objects to be transported in an elevated position above said roadway, a control frame having two front wheels, and two pivotally mounted control wheels that are mounted rearward on said control frame, and a tracking frame having two rear wheels, where said tracking frame is rearward of said control frame, where wheels are attached to frames such that three wheels operate in a column on each side of said articulated vehicle, and equipment is configured along said column to create a wheel train effect that minimizes projected frontal area, structure that connects from each frame to said carriage to hold said carriage at said elevated position above said roadway, where said structure is configured as an articulating linkage that enables relative hinging between said carriage and said control frame about a yaw hinging axis and relative hinging between said carriage and said tracking frame about a pitch hinging axis while preventing relative hinging action between frames about a roll hinging axis, and a linkage from said carriage to said control wheels that is configured to enable control of pivot action of said control wheels, where operation of a forward moving said articulated vehicle includes superior driving action enabled by a high vantage point for said driver due to said elevated position that is provided for said driver, pitch hinging action that maintains a front wheel, a control wheel, and a rear wheel in firm contact with said road surface, thus accommodating uneven surfaces of said roadway, yaw hinging action, where driver action through said control linkage adjusts travel direction of said control wheels, where a changed travel direction causes lateral motion of said control wheels that causes said yaw hinging action, thus setting said front wheels to make a turn, where a simultaneous effect of said yaw hinging action is that a control wheel is caused to extend laterally toward an outside of said turn, thus setting a stabilizing stance, articulated operation where said stabilizing stance acts through roll preventing linkages to prevent rollover, and articulated operation where said carriage and said tracking frame follows said control frame as a trailer that is connected at a point on said yaw hinging axis.

24. A narrow articulated vehicle for operation on a roadway, that includes a carriage to enclose at least one person, with said carriage providing a width no greater than would be suitable for seating of a single person, thus enabling said narrow articulated vehicle, a control frame having two front wheels, and two pivotally mounted control wheels that are mounted rearward on said control frame, and a tracking frame having two rear wheels, where said tracking frame is rearward of said control frame, where wheels are attached to frames such that three wheels operate in a column on each side of said articulated vehicle, and equipment is configured along said column to create a wheel train that minimizes projected frontal area, structure that connects from each frame to said carriage to hold said carriage at an elevated position above said roadway, where said structure is configured as an articulating linkage that enables relative hinging between said carriage and said control frame about a yaw hinging axis and relative hinging between said carriage and said tracking frame about a pitch hinging axis while preventing relative hinging action between frames about a roll hinging axis, and a linkage from said carriage to said control wheels that is configured to enable control of pivot action of said control wheels, where operation of a forward moving said narrow articulated vehicle includes aerodynamic benefits, including that of said elevated position that enables reduced said drag force on said carriage, and that of minimized said projected frontal area of said column that minimizes aerodynamic drag of wheels and intervening equipment, pitch hinging action that maintains a front wheel, a control wheel, and a rear wheel in firm contact with said road surface, thus accommodating uneven surfaces of said roadway, yaw hinging action, where driver action through said control linkage adjusts travel direction of said control wheels, where a changed travel direction causes lateral motion of said control wheels that causes said yaw hinging action, thus setting said front wheels to make a turn, where a simultaneous effect of said yaw hinging action is that a control wheel is caused to extend laterally toward an outside of said turn, thus setting a stabilizing stance, articulated operation where said stabilizing stance acts through roll preventing linkages to prevent rollover, and articulated operation where said tracking frame and said carriage follow travel direction of said control frame, being guided by a point of attachment on said yaw hinging axis.

25. A narrow articulated vehicle according to claim 24, where said wheel train significantly contributes to stability of said narrow articulated vehicle, thereby reducing the chance of roll over motion.

26. A narrow articulated vehicle according to claim 24, where said structure enables independent aerodynamic operation of said carriage and wheel trains.

27. A narrow articulated vehicle according to claim 24, where said wheel trains include heavy items that enhance vehicle stability.

* * * * *